US012623549B2

(12) United States Patent
Tate

(10) Patent No.: US 12,623,549 B2
(45) Date of Patent: May 12, 2026

(54) POWER SYSTEM

(71) Applicant: Hamilton Sundstrand Corporation, Charlotte, NC (US)

(72) Inventor: David James Tate, Hemel Hempstead (GB)

(73) Assignee: Hamilton Sundstrand Corporation, Charlotte, NC (US)

(*) Notice: Subject to any disclaimer, the term of this patent is extended or adjusted under 35 U.S.C. 154(b) by 141 days.

(21) Appl. No.: 18/393,942

(22) Filed: Dec. 22, 2023

(65) Prior Publication Data

US 2024/0270076 A1  Aug. 15, 2024

(51) Int. Cl.
*B60L 15/20*  (2006.01)
*B60L 3/00*  (2019.01)
*B64D 35/024*  (2024.01)

(52) U.S. Cl.
CPC ............. *B60L 3/0061* (2013.01); *B60L 15/20* (2013.01); *B64D 35/024* (2024.01); *B60L 2200/10* (2013.01); *B60L 2220/42* (2013.01)

(58) Field of Classification Search
CPC .. B60L 15/20; B60L 2200/10; B60L 2220/42; B60L 3/0061
See application file for complete search history.

(56) References Cited

U.S. PATENT DOCUMENTS

| | | | |
|---|---|---|---|
| 3,091,316 A | 5/1963 | Huffman | |
| 4,773,518 A | 9/1988 | Raad et al. | |
| 4,997,072 A | 3/1991 | Lapthorne | |
| 10,407,178 B2* | 9/2019 | Regev ................... | B64D 27/34 |
| 11,472,544 B2* | 10/2022 | Heironimus ........... | B64D 27/34 |
| 11,498,663 B2 | 11/2022 | Schmidt et al. | |
| 11,794,915 B2* | 10/2023 | Churchill ............... | B64C 11/02 |
| 12,172,770 B2* | 12/2024 | Beall .................... | B64D 35/021 |
| 2016/0329777 A1* | 11/2016 | Mariotto ............... | B64D 27/33 |
| 2021/0276706 A1 | 9/2021 | Heironimus et al. | |
| 2021/0362862 A1* | 11/2021 | Jaljal ........................ | F02C 6/20 |
| 2022/0274715 A1* | 9/2022 | Beall ...................... | B64D 27/31 |
| 2022/0340292 A1* | 10/2022 | Churchill ............... | B60L 15/20 |

FOREIGN PATENT DOCUMENTS

KR  2021 0073189 A  6/2021

OTHER PUBLICATIONS

Extended European Search Report Issued in corresponding European Patent Application No. 23156393.3 on Jul. 11, 2023. (23 pages).

* cited by examiner

*Primary Examiner* — Thai T Dinh

(57) ABSTRACT

A power system for an aircraft comprises: a first motor-generator component; a second motor-generator component; a common shaft, wherein the first and second motor-generator components are connected to the common shaft in series; and a de-coupler operable to disconnect the first motor-generator component from the common shaft.

20 Claims, 2 Drawing Sheets

POWER SYSTEM

CROSS-REFERENCE TO RELATED APPLICATIONS

This application claims priority to and the benefit of European Patent Application No. 23156393.3, filed Feb. 13, 2023, the entire content of which is incorporated by reference herein.

FIELD OF THE INVENTION

This application relates to power systems for aircraft.

BACKGROUND

In power systems for hybrid or electric propulsion aircraft, it may be desirable to include a plurality of motor-generator components (e.g. motors, generators or motor-generators) to provide redundancy and to give flexibility to meet speed, torque or power generation demands. However, such systems may require complex architectures, often with heavy, intermediate components, to connect the motor-generator components to other components of the system.

SUMMARY

In a first aspect, there is provided a power system for an aircraft, the power system comprising: a first motor-generator component; a second motor-generator component; a common shaft, wherein the first and second motor-generator components are connected to the common shaft in series; and a de-coupler operable to disconnect the first motor-generator component from the common shaft.

Connecting the motor-generator components (e.g. motors, generators or motor-generators) to the common shaft in series can be space efficient and low-weight. The de-coupler improves the reliability of the power system, allowing the first motor-generator component to be disconnected from the common shaft in the event of the first motor-generator component having a fault. This may allow the second motor-generator component to continue to operate in the event of the first motor-generator component having the fault.

The power system may comprise a second de-coupler operable to disconnect the second motor-generator component from the common shaft.

The first motor-generator may comprise a first shaft, wherein the first shaft and the common shaft nest with each other. One of the common shaft and the first shaft may surround the other of the common shaft and the first shaft.

The first shaft may surround the common shaft.

The first shaft may be the first motor-generator's input and/or output shaft.

The common shaft may extend through the first motor.

The second motor-generator may comprise a second shaft, wherein the second shaft and the common shaft nest with each other. One of the common shaft and the second shaft may surround the other of the common shaft and the second shaft.

The second shaft may surround the common shaft.

The second shaft may be the second motor-generator's input and/or output shaft.

The common shaft may extend through the second motor.

The de-coupler may comprise a connector element, the connector element movable into a disconnected position to disconnect the first motor-generator component from the common shaft.

The connector element may be slidable into the disconnected position.

The connector element and the common shaft may nest with each other. The connector element may surround the common shaft.

The power system may comprise an actuator, the actuator configured to move the connector element into the disconnected position.

The actuator may be configured to maintain the connector element in the disconnected position in response to power being supplied to the actuator.

The actuator may be configured to move the connect element out of the disconnected position.

The power system may comprise a latch, the latch configured to maintain the connector element in the disconnected position.

The actuator may be an electromagnetic actuator. The actuator may be a solenoid.

The connector element may comprise a first torque coupler for connecting to the first shaft. The first torque coupler may comprise connector element teeth configured to engage with first shaft teeth on the first shaft. The connector element teeth may extend in an axial direction (e.g. parallel to an axis of the common shaft and/or an axis of the first shaft). The first shaft may comprise the first shaft teeth configured to engage with the connector element teeth. The first shaft teeth may extend in the axial direction. The first shaft teeth may extend in an opposing direction to the connector element teeth.

The first torque coupler may be disconnected when the connector element is in the disconnected position. The connector element teeth may be out of contact with the first shaft teeth when the connector element is in the disconnected position.

The connector element may comprise a second torque coupler for connecting to the common shaft. The second torque coupler may comprise a sliding spline.

The power system may comprise a bias element. The bias element may be configured to bias the connector element away from the disconnected position. The bias element may be configured to bias the connector element towards the disconnected position. The bias element may be a spring.

The second de-coupler may comprise a second connector element, the second connector element movable into a disconnected position to disconnect the second motor-generator component from the common shaft.

The second connector element may be slidable into the disconnected position.

The second connector element and the common shaft may nest with each other. The second connector element may surround the common shaft.

The power system may comprise a second actuator, the second actuator configured to move the second connector element into the disconnected position.

The second actuator may be configured to maintain the second connector element in the disconnected position in response to power being supplied to the second actuator.

The second actuator may be configured to move the second connect element out of the disconnected position.

The power system may comprise a second latch, the second latch configured to maintain the second connector element in the disconnected position.

The second actuator may be a solenoid.

The second connector element may comprises a third torque coupler for connecting to the second shaft. The third torque coupler may comprise second connector element teeth configured to engage with second shaft teeth on the second shaft. The second connector element teeth may extend in an axial direction (e.g. parallel to an axis of the common shaft and/or an axis of the second shaft). The second shaft may comprise the second shaft teeth configured to engage with the second connector element teeth. The second shaft teeth may extend in the axial direction.

The third torque coupler may be disconnected when the second connector element is in the disconnected position. The second connector element teeth may be out of contact with the second shaft teeth when the second connector element is in the disconnected position.

The second connector element may comprise a fourth torque coupler for connecting to the common shaft. The fourth torque coupler may comprise a second sliding spline.

The power system may comprise a second bias element. The second bias element may be configured to bias the second connector element away from the disconnected position. The second bias element may be configured to bias the second connector element towards the disconnected position. The second bias element may be a spring.

The first motor-generator component may comprise a motor.

The second motor-generator component may comprise a motor.

The common shaft may be an output shaft. The output shaft may be configured to transmit torque to a turbine.

The first motor-generator component may comprise a generator.

The second motor-generator component may comprise a generator.

The common shaft may be an input shaft. The input shaft may be configured to receive torque from a turbine.

The first motor-generator component may comprise a motor-generator.

The second motor-generator component may comprise a motor-generator.

The common shaft may be an input-output shaft. The input-output shaft may be configured to transmit torque to a turbine and receive torque from the turbine.

In a second aspect there is provided an aircraft comprising the power system described above.

The aircraft may comprise a turbine connected to the common shaft.

The aircraft of the second aspect may comprise any of the features described above with respect to the first aspect.

BRIEF DESCRIPTION OF THE DRAWINGS

Various examples will now be described with reference to the accompanying drawings in which.

DETAILED DESCRIPTION

Figure 1:
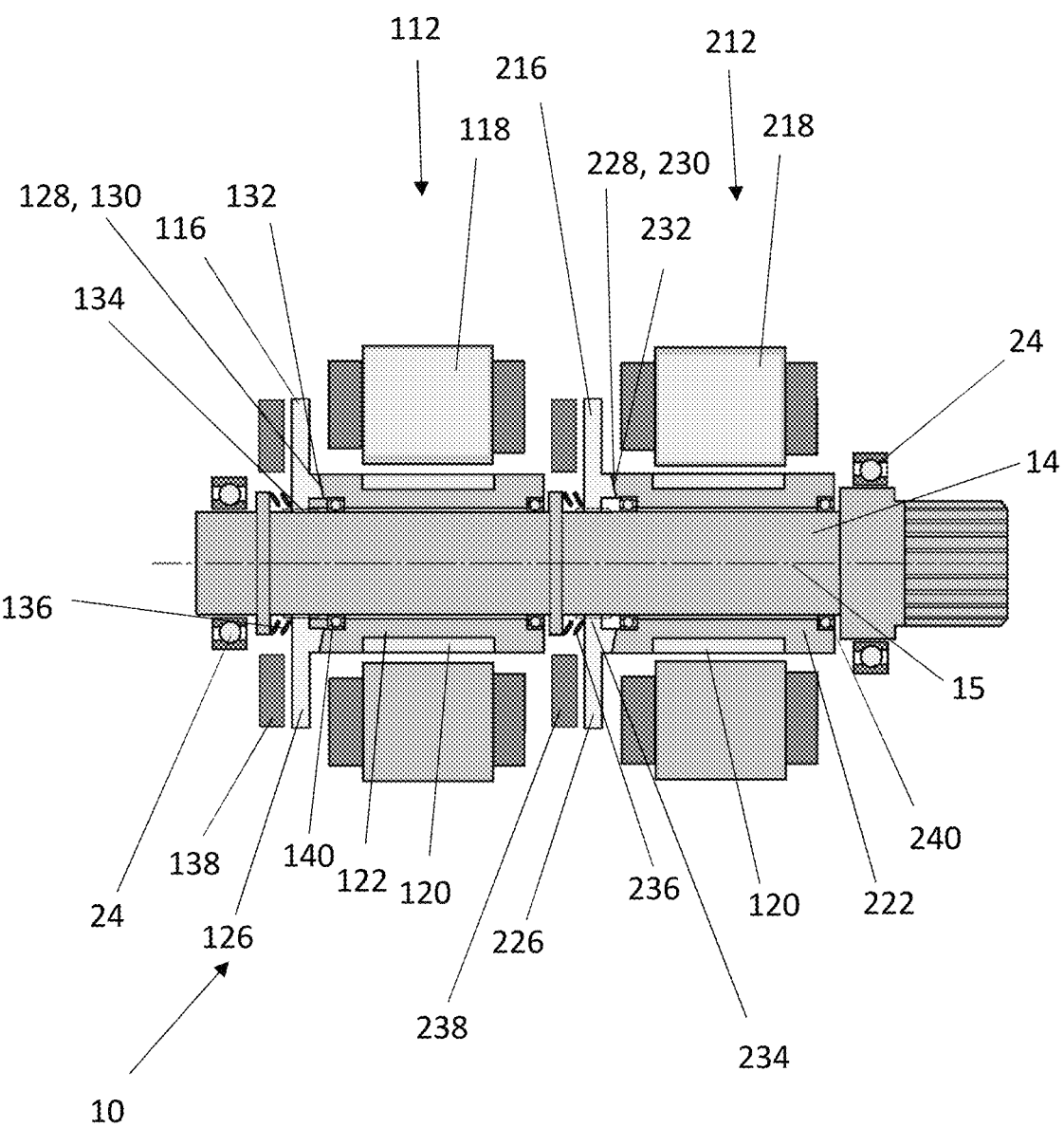
FIG. 1 shows a schematic cross-sectional drawing of a power system with a connector element in a connected position.
Figure 2:
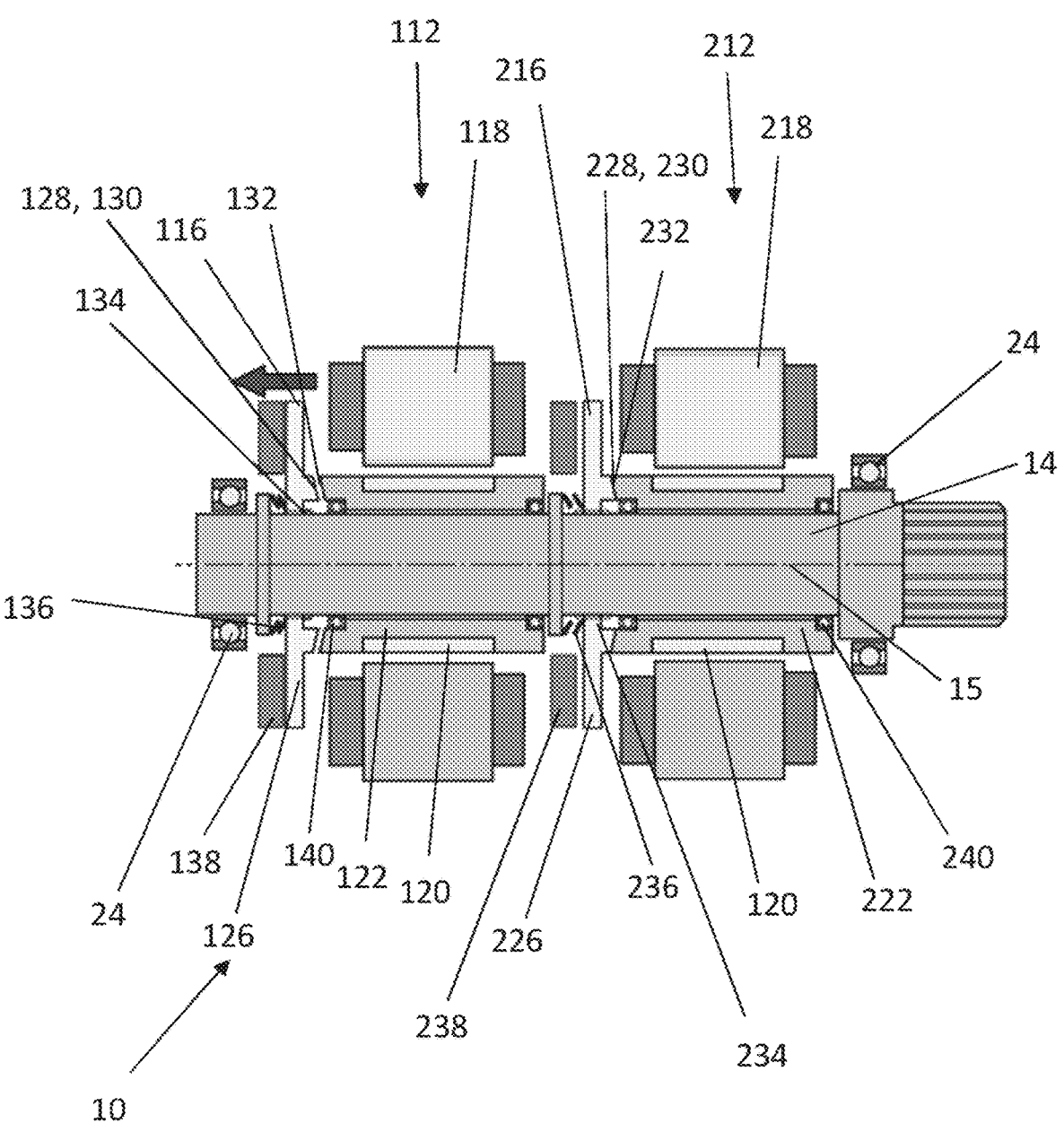
FIG. 2 shows a schematic cross-sectional drawing of the power system with a connector element in a disconnected position.

FIG. 1 and FIG. 2 show a power system 10 for an aircraft (not shown). The power system 10 comprises a first motor-generator component 112, a second motor-generator component 212, a common shaft 14, a first de-coupler 116 and a second de-coupler 216. The common shaft 14 connects the first motor-generator component 112 to an additional component (not shown), which in the present example is a turbine (not shown). The common shaft 14 also connects the second motor-generator component 212 to the additional component. The common shaft 14 is supported on the aircraft by a pair of common shaft bearings 24.

The first motor-generator component 112 comprises a first shaft 122. In the present example the motor-generator component 112 is a first motor-generator 112. The first shaft 122 is an input-output shaft 122 configured to transfer torque with the additional component, in the present example, by transmitting a torque to the additional component and receiving a torque from the additional component.

In other examples the first motor-generator component 112 is a motor and not a generator, and the first shaft 122 is an output shaft configured to transfer torque with the additional component by transmitting a torque to the additional component. In other examples the first motor-generator component 112 is a generator and not a motor, and the first shaft 122 is an input shaft configured to receive torque from the additional component.

The first motor-generator component 112 comprises a first stator 118 and a first rotor 120. The first stator 118 surrounds the first rotor 120. The first rotor 120 is fixed to the first shaft 122. The first shaft 122 is rotatably supported on the common shaft 14 by a first pair of motor-generator shaft bearings 140.

The second motor-generator component 212 comprises all of the features of the first motor-generator component 112. The second motor-generator component 212 comprises a second stator 218 (having the same features as the first stator 118), a second rotor 220 (having the same features as the first rotor 120), a second shaft 222 (having the same features as the first shaft 122) and a second pair of motor-generator shaft bearings 240 (having the same features as the first part of motor-generator shaft bearings 240), each arranged as described above. Repeated description of those components is omitted.

As with the first motor-generator component 112, the second motor-generator component 212 is a motor-generator 212. However, in other examples, the second motor-generator component 212 may be a motor or a generator.

The first de-coupler 116 comprises a first connector element 126 for connecting the first shaft 122 to the common shaft 14. The first connector element 126 comprises a first torque coupler 128. The first connector element 126 connects to the first shaft 122 via the first torque coupler 128.

The first torque coupler 128 comprises first connector element teeth (not shown). The first connector element teeth extend from an axial (defined with respect to an axis 15 of the common shaft 14) face 130. The first connector element teeth extend in an axial direction (e.g. parallel to the axis 15 of the common shaft 14). The first connector element teeth extend towards the first shaft 122.

The first shaft 122 comprises first shaft teeth (not shown). The first shaft teeth extend from an axial face 132 of the first shaft 122. The axial face 132 of the first shaft 122 faces the axial face 130 of the first torque coupler 128. The first shaft teeth extend in an axial direction, opposing the first connector element teeth. The first connector element teeth are configured to engage with the first shaft teeth to connect the first connector element 126 to the first shaft 122 and transmit torque between the first connector element 126 and the first shaft 122.

The first connector element 126 comprises a second torque coupler 134. The second torque coupler 134 connects the first connector element 126 to the common shaft 14. The first connector element 126 surrounds the common shaft 14. The second torque coupler 134 faces the common shaft 14. The second torque coupler 134 comprises a first sliding spline (not shown). The first sliding spline comprises grooves for engaging with corresponding grooves on the common shaft 14. As such, the second torque coupler 134 remains connected to the common shaft 14 as the first connector element 126 slides relative to the common shaft 14.

The second de-coupler 216 comprises all of the features of the first de-coupler 116. The second de-coupler 216 comprises a second connector element 226 (corresponding to the first connector element 126) for connecting the second shaft 222 to the common shaft 14.

The second connector element 226 comprises a third torque coupler 228 (having the same features as the first torque coupler 128). The second connector element 226 connects to the second shaft 222 via the third torque coupler 228, in the same manner as described above with respect to the first connector element 126, the first shaft 122 and the first torque coupler 128.

The second connector element 226 comprises a fourth torque coupler 234 (having the same features as the second torque coupler 134). The fourth torque coupler 234 connects the second connector element 226 to the common shaft, in the same manner as described above with respect to the first connector element 126, the second torque coupler 134 and the common shaft 14.

Again, repeated description of common features is omitted.

The power system 10 comprises a first bias element 136. The first bias element 136 is configured to bias the first connector element 126 to a connected position, as described in more detail below. The first bias element 136 is a spring. The first bias element 136 contacts the common shaft 14 and the first connector element 126. The axial position of the common shaft 14 is fixed relative to the aircraft. The first bias element 136 forces the first connector element 126 towards the first shaft 122 by pushing against the common shaft 14.

The power system 10 comprises a first actuator 138. The first actuator 138 is an electromagnetic actuator. The first actuator 138 is a solenoid. As described below, the first actuator 138 is configured to apply a force to the first connector element 126 to move the first connector element 126 to a disconnected position. In the present example the first actuator 138 is energised to apply the force to the first connector element 126. The first actuator 138 is configured to overcome the force of the first bias element 136.

The power system 10 comprises a second bias element 236. The second bias element 236 is configured to bias the second connector element 226 to a connected position, as described in more detail below. The second bias element 236 is a spring. The second bias element 236 contacts the common shaft 14 and the second connector element 226. The second bias element 236 forces the second connector element 226 towards the second shaft 222 by pushing against the common shaft 14.

The power system 10 comprises a second actuator 238. The second actuator 238 is an electromagnetic actuator. The second actuator 238 is a solenoid. As described below, the second actuator 238 is configured to apply a force to the second connector element 226 to move the second connector element 226 to a disconnected position. In the present example the second actuator 238 is energised to apply the force to the second connector element 226. The second actuator 238 is configured to overcome the force of the second bias element 236.

The first shaft 122 and the common shaft 14 nest with each other. The first shaft 122 surrounds the common shaft 14. The first shaft 122, the common shaft 14 and the first stator 118 are coaxial.

The common shaft 14 extends through the first motor-generator component 112. The first connector element 116 is positioned on an opposite side of the first motor-generator component 112 to the additional component (not shown). The first motor-generator component 112 is between the first connector element 116 and the additional component. This may mean that the first connector element 116 is inboard (with respect to an aircraft's wing) of the first motor-generator component 112.

The second shaft 222 and the common shaft 14 nest with each other. The second shaft 222 surrounds the common shaft 14. The second shaft 222, the common shaft 14 and the second stator 218 are coaxial.

The first motor-generator component 112 and the second motor-generator component 212 are connected to the common shaft 14 in series. The first motor-generator component 112 and the second motor-generator component 212 are connected at different points along a length of the common shaft 14. The first motor-generator component 112 and the second motor-generator component 212 are connected to the common shaft 14 without an intermediate gearbox component.

The common shaft 14 extends through the second motor-generator component 212. The second connector element 216 is positioned on an opposite side of the second motor-generator component 212 to the additional component (not shown). The second motor-generator component 212 is between the second connector element 216 and the additional component.

This may mean that the second connector element 216 is inboard (with respect to an aircraft's wing) of the second motor-generator component 212.

The second motor-generator component 212 is between the first motor-generator component 112 and the additional component. The second de-coupler 216 is between the first motor-generator component 112 and the second motor-generator component 212.

FIG. 1 shows the power system 10 with the first connector element 126 in the connected position. In the present example, the first actuator 138 is not energised and the first bias element 136 maintains the first connector element 126 in the connected position.

In the connected position the first connector element 126 is connected, via the first torque coupler 128, to the first shaft 122. The first connector element 126 remains connected, via the second torque coupler 134 to the common shaft 14.

FIG. 1 also the shows the power system with the second connector element 226 in the connected position. In the present example, the second actuator 238 is not energised and the second bias element 236 maintains the second connector element 226 in the connected position.

In the connected position the second connector element 226 is connected, via the third torque coupler 228, to the second shaft 222. The second connector element 226 remains connected, via the fourth torque coupler 234 to the common shaft 14.

In use, when the first motor-generator component 112 acts as a motor, the first stator 118 provides a magnetic field that drives the first rotor 120. Because the first rotor 120 is fixed to the first shaft 122, the first shaft 122 rotates with the first rotor. The rotation of the first shaft 122 causes the first connector element 126 to rotate, in this example due to the engagement of the connector element teeth with the second shaft teeth. The rotation of the first connector element 126 causes the common shaft 14 to rotate (in this example due to the engagement at the sliding spline). The common shaft 14 then provides an output torque to the additional component, which in this example is a turbine.

When the second motor-generator component 212 acts as a motor (which may be at the same time that the first motor-generator component 112 acts as a motor or at a different time depending on power output requirements) it transfers power to the common shaft 14 in the same manner as the first motor-generator component 112 via the second stator 218, the second rotor 220, the second shaft 222 and the second connector element 226.

When the first motor-generator component 112 acts as a generator, the additional component applies a torque to the common shaft 14 to cause the common shaft 14 to rotate. The rotation of the common shaft 14 causes the first connector element 126 to rotate (in this example due to the engagement at the sliding spline). The rotation of the first connector element 126 causes the first shaft 122 to rotate (in this example due to the engagement of the connector element teeth with the second shaft teeth). The first rotor 120 in turn rotates, which induces a current in the first stator 118. The current induced in the first stator 118 may be used to charge a battery or other energy storage (not shown), which may be used to drive the motor-generator components 112 212 as motors later.

When the second motor-generator component 212 acts as a generator (which may be at the same time that the first motor-generator component 112 acts as a generator or at a different time depending on power generation requirements) it receives power from common shaft 14 in the same manner as the first motor-generator component 112 via the second stator 218, the second rotor 220, the second shaft 222 and the second connector element 226.

FIG. 2 shows the power system 10 with the first connector element 126 of the first de-coupler 116 in the disconnected position, in which the first de-coupler 116 disconnects the first motor-generator component 112 from the common shaft 14. The first de-coupler 116 may be controlled to disconnect the first motor-generator component 112 from the common shaft 14 in response to a fault with the first motor-generator component 112.

In order to disconnect the first motor-generator component 112 from the common shaft 14, in the present example, the first actuator 138 is energised. This causes the first actuator 138 to apply a force to the first connector element 126, to overcome the force provided by the first bias element 136. This forces the first connector element 126 out of contact with the first shaft 122. In the disconnected position, the connector element teeth are out of contact with the second shaft teeth. The first de-coupler 116 thereby disconnects the first motor-generator component from the common shaft 14. The common shaft 14 and the first shaft 122 can then rotate independently of each other, with no torque transferred between the first motor-generator component 112 and the additional component.

In FIG. 2, the second connector element 226 remains in the connected position. The second motor-generator component 212 can continue to operate as a motor or as generator, transferring torque with the additional component via the common shaft 14.

While this is not depicted in the figures, the second de-coupler 216 may disconnect the second motor-generator component 212 from the common shaft 14, with the second connector element 226 of the second de-coupler 226 moving into the disconnected position. This may be implemented by energising the second actuator 238 to apply a force to the second connector element 226.

In other examples, the bias elements and actuators may apply their forces to the connector elements in directions opposite to those described above. In such examples, the bias elements may force the connector elements towards the disconnected position. The actuators may be energised to apply a force to the connector elements to overcome the bias elements and move the connector elements to the connected position.

Various aspects of the apparatus disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A power system for an aircraft, the power system comprising:
   a first motor-generator component including a first drive shaft;
   a second motor-generator component including a second drive shaft;
   a common shaft, wherein the first and second motor-generator components are connected to the common shaft in series; and
   a de-coupler operable to disconnect the first drive shaft of the first motor-generator component from the common shaft, wherein the de-coupler comprises:
      a first torque coupler configured to selectively couple the first drive shaft of the first motor-generator component with the de-coupler; and
      a second torque coupler configured to couple the common shaft with the de-coupler.

2. The power system according to claim 1, further comprising a second de-coupler operable to disconnect the second drive shaft of the second motor-generator component from the common shaft, wherein the second de-coupler comprises:
   a third torque coupler configured to selectively couple the second drive shaft of the second motor-generator component with the second de-coupler; and
   a fourth torque coupler configured to couple the common shaft with the second de-coupler.

3. The power system according to claim 1, wherein the first drive shaft and the common shaft nest with each other.

4. The power system according to claim 1, wherein the common shaft extends through the first motor-generator component.

5. The power system according to claim 1, wherein the de-coupler is configured to slide from a first position to a second position along an axis of the common shaft to disconnect the first drive shaft of the first motor-generator component from the common shaft.

6. The power system according to claim 5, further comprising an actuator, the actuator configured to move the de-coupler from the first position to the second position to disconnect the first drive shaft of the first motor-generator component from the common shaft.

7. The power system according to claim 5, wherein the actuator is a solenoid.

8. The power system according to claim 1, wherein the first torque coupler comprises connector element teeth extending parallel to an axis of the common shaft and configured to engage with first shaft teeth extending parallel to the axis of the common shaft.

9. The power system according to claim 1, wherein the first torque coupler is disconnected from the common shaft when the de-coupler is in a disconnected position.

10. The power system according to claim 1, wherein the second torque coupler comprises a sliding spline configured to maintain connection between the second torque coupler and the common shaft as the de-coupler moves between a connected position and a disconnected position.

11. The power system according to claim 1, further comprising a bias element, the bias element configured to bias the de-coupler away from a disconnected position.

12. The power system according to claim 1, wherein the first motor-generator component comprises a motor.

13. The power system according to claim 1, wherein the first motor-generator component comprises a generator.

14. An aircraft comprising the power system according to claim 1.

15. The power system according to claim 1, wherein the second torque coupler is configured to maintain a connection between the common shaft and the de-coupler as the de-coupler moves between a connected position and a disconnected position.

16. A power system comprising:

a first motor-generator component including a first drive shaft;

a second motor-generator component including a second drive shaft;

a common shaft, wherein the first and second motor-generator components are connected to the common shaft in series;

a first de-coupler configured to disconnect the first drive shaft of the first motor-generator component from the common shaft, wherein the first de-coupler comprises:

a first torque coupler configured to selectively couple the first drive shaft of the first motor-generator component with the first de-coupler; and a second torque coupler configured to couple the common shaft with the first de-coupler;

a first bias element configured to bias the first de-coupler away from a disconnected position;

a second de-coupler configured to disconnect the second drive shaft of the second motor-generator component from the common shaft, wherein the second de-coupler further comprises:

a third torque coupler configured to selectively couple the second drive shaft of the second motor-generator component with the second de-coupler;

a fourth torque coupler configured to couple the common shaft with the second de-coupler; and a second bias element configured to bias the second de-coupler away from the disconnected position.

17. The power system according to claim 16, wherein the second torque coupler and the fourth torque coupler are configured to maintain a connection between the common shaft and the first de-coupler and the second de-coupler, respectively, as the first de-coupler and the second de-coupler move between a connected position and a disconnected position.

18. The power system according to claim 16, wherein each of the first torque coupler and the third torque coupler comprises connector element teeth extending parallel to an axis of the common shaft and configured to engage with shaft teeth extending parallel to the axis of the common shaft.

19. The power system according to claim 16, wherein the second torque coupler and the fourth torque coupler comprise sliding splines configured to maintain connection between the second torque coupler and the common shaft and the fourth torque coupler and the common shaft as the first de-coupler and the second de-coupler move between a connected position and a disconnected position.

20. The power system according to claim 16, further comprising:

a first bias element configured to bias the first de-coupler away from a disconnected position; and a second bias element configured to bias the second de-coupler away from the disconnected position.

* * * * *